United States Patent [19]
Lumbis et al.

[11] Patent Number: 6,012,681
[45] Date of Patent: Jan. 11, 2000

[54] AUTOMATIC IDENTIFICATION OF EP BRAKE EQUIPPED RAILCARS

[75] Inventors: Anthony W. Lumbis, Watertown; Dale R. Stevens, Adams Center; Bryan M. McLaughlin, Watertown, all of N.Y.

[73] Assignee: New York Air Brake Corporation, Watertown, N.Y.

[21] Appl. No.: 09/201,871

[22] Filed: Nov. 30, 1998

Related U.S. Application Data

[63] Continuation of application No. 08/689,813, Aug. 14, 1996.

[51] Int. Cl.[7] ...................................................... B61L 3/00
[52] U.S. Cl. ................................ 246/187 C; 246/187 R; 246/182 B
[58] Field of Search ........................... 246/166.1, 167 R, 246/182 R, 182 B, 187 R, 187 C

[56] References Cited

U.S. PATENT DOCUMENTS

| | | | |
|---|---|---|---|
| 4,702,291 | 10/1987 | Engle | 105/35 |
| 4,825,189 | 4/1989 | Honma et al. | 246/166.1 |
| 5,053,964 | 10/1991 | Mister et al. | 246/187 C |
| 5,265,832 | 11/1993 | Wesling et al. | 246/187 R |
| 5,530,328 | 6/1996 | Fernandez et al. | 246/187 R |
| 5,673,876 | 10/1997 | Lumbis et al. | 246/167 R |

OTHER PUBLICATIONS

"A Breakthrough in Trainline Communications?"; Anderson et al, Railway Age, pp. 37–44, Aug. 1995.

"The Electro–Pneumatic Pilot Adaptor"; The Duluth and Iron Range Company Inc., Sep. 1993.

*Primary Examiner*—S. Joseph Morano
*Attorney, Agent, or Firm*—Barnes & Thornburg

[57] ABSTRACT

An automatic identification system having a storage device mounted on the car, which includes the car identification data. A reading device is connected to a local communication node which communicates with the locomotive in a network. The local communication node communicates the read identification data to the controller at the locomotive. The identification data includes at least the serial number, brake ratio, light weight and gross rail weight of the car. The storage device is permanently mounted on the car, preferably at a junction box or pipe bracket. A current sensor is also connected to the local communication node. The storage device and current sensor are part of a subsidiary communication node under the control of the communication node.

19 Claims, 3 Drawing Sheets

AUTOMATIC IDENTIFICATION OF EP BRAKE EQUIPPED RAILCARS

CROSS-REFERENCE

This is a Continuation of application Ser. No. 08/689,813 filed Aug. 14, 1996.

BACKGROUND AND SUMMARY OF THE INVENTION

The present invention relates generally to automatic identification of railcars and more specifically, to the automatic identification of railcars equipped with electro-pneumatic brakes.

With the addition of electro-pneumatically operated train brakes to railway freight cars comes a need to be able to automatically identify the types, weights, and braking ratios of the individual cars in the train. Present systems address this by requiring that the serial numbers of the cars and other car related information be manually entered into a data file in the locomotive controller. While this does provide the information necessary to properly identify each car in the train, it is very time consuming when dealing with long trains (for example, 100 cars or more), and must be manually updated every time the train make-up changes (i.e., when cars are dropped off or picked up). Also, manually entering data increases the chance of errors. Manually entering data of the light weight, gross rail weight or braking ratios would be even more cumbersome, so this information is currently not being entered or captured.

The presently configured electro-pneumatically operated train brakes includes a communication network with a node at each car. This provides an appropriate network to communicate the desired information from the car to the locomotive controller. Since the brake valve, brake equipment or the electro-pneumatic communication node controller may be changed on the cars, there must be a means to provide the information which is a permanent part of the car.

Thus, it is an object of the present invention to alleviate the need for manually entering car specific data.

Another object of the present invention is to automatically identify each car and its associated light weight, gross rail weight, braking ratio and other pertinent information.

It is still an even further object of the present invention to provide this information permanently on the car so as not to be affected by repair or change of brake equipment on the car.

An even further object of the present invention to provide an automatic identification of the railcars which is compatible or integral with other reporting systems on the car.

These and other objects are achieved by providing a storage device mounted on the car, including the car identification data. A reading device is connected to the local communication node which communicates with the locomotive and a network for reading the identification data stored in the storage device. The local communication node then communicates the read identification data to the controller at the locomotive. The identification data includes at least the serial number, brake ratio, light weight and gross rail weight of the car. The storage device is permanently mounted on the car. The storage device may be mounted on the pipe bracket of the electrically controlled pneumatic valve or may be attached to a junction box which connects the electric trainline to the local communication node. Preferably, the storage device and the reading device are a subsidiary communication node controlled by the local communication node and activated by the local communication node when it requires the information.

The storage device may be a passive electronic transponder and the reading device sends a signal to the passive device to read the identification data. As another alternative, the storage device may be electrically connected to the local controller or the subsidiary communication node where the subsidiary communication node is at the junction box. Where the storage device is mounted on, the pipe bracket, for example, the communication node is mounted adjacent to the storage device to directly access the identification data. The storage device may have a housing which includes surface terminals and the local communication node engages these surface terminals directly. Thus, additional wiring and connections are avoided. The passive transponder reading of the information may also result from mounting the local communication node adjacent to the permanently mounted storage device.

Where the subsidiary node is at the junction box, an electrical cable connection is made between the subsidiary communication node and the local communication node. Also, a current sensor is provided as part of the subsidiary node. The sensed current can be sensed by the subsidiary node or stored in the storage device. This information can then be transmitted to the local communication node and subsequently to the controller. This sensed current can be used in train serialization routines or other uses.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
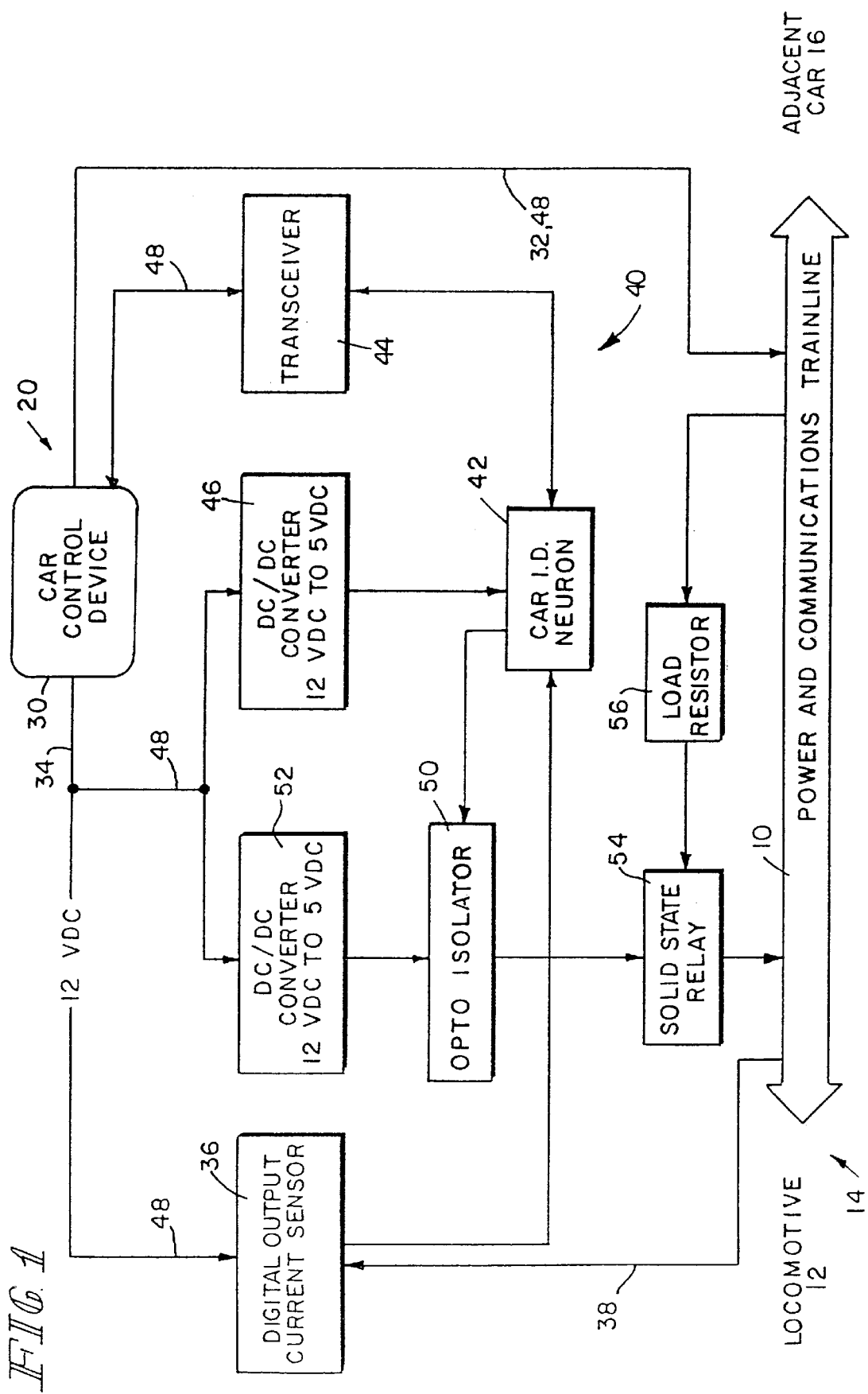
FIG. 1 is a schematic of a local communication node incorporating the principles of the present invention.

A train consists of one or more locomotives and a plurality of cars. A power and communication trainline 10 interconnects locomotive 12, car 14 and adjacent car 16 as shown in FIG. 1. The American Association of Railroads has selected as a communication architecture for electro-pneumatic (EP) systems LonWorks by Echelon. Each car includes a Neuron chip as a communication node in this design. The trainline's power and communication is either over common power lines or over power and separate communication lines. The individual communication nodes are also powered from a common power line even though they may include local storage battery sources.

The local communication node includes a car control device 30. The car control device 30 includes a Neuron chip, appropriate voltage regulators, memory and a transceiver to power itself and communicate with a locomotive controller and other cars as a node in the communication network. A LonWorks network is well-known and therefore need not to be described herein. The car control device 30 is capable of operating electro-pneumatic brakes as well as providing the necessary communication. The car control device can also provide the necessary monitoring control functions of other operations at the individual cars.

Figure 3:
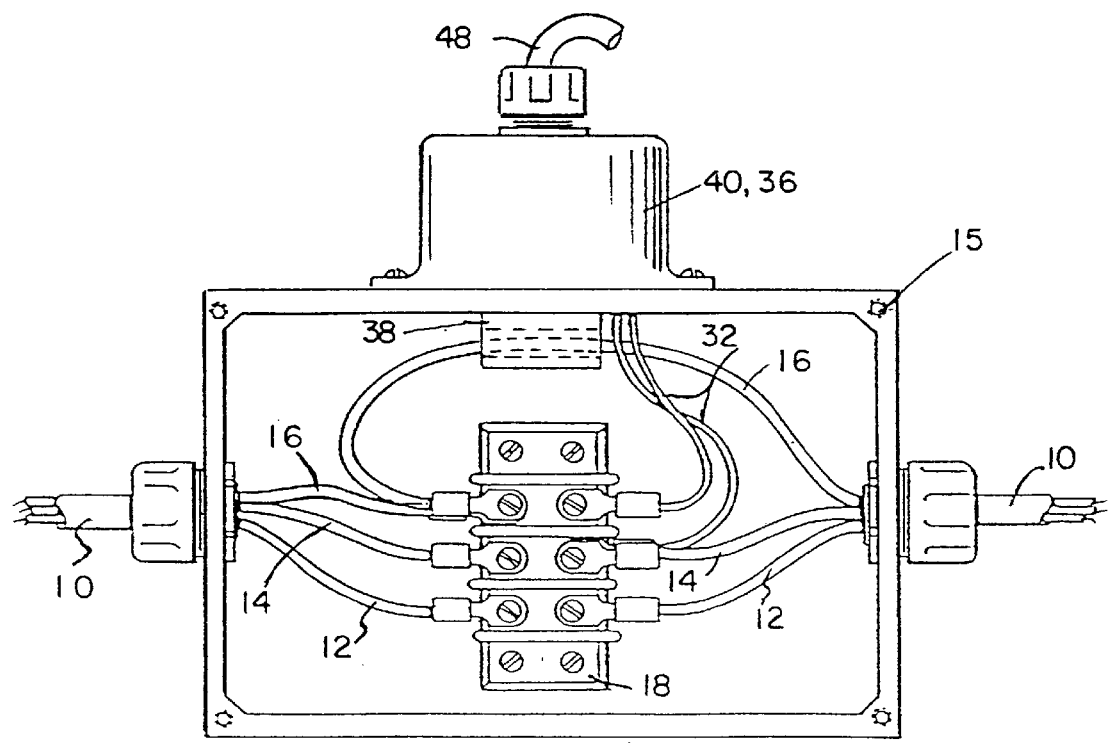
FIG. 3 is a side view of a junction box with its plate removed showing the attachment of a subsidiary communication node with current sensing capability.

Cable 32, 48 connects the car control device 30 to the power and communication trainline 10 so as to power the car control device and to provide the necessary communication using the transceiver of the car control device. The car control device 30 provides a DC voltage of approximately 12 volts on line 34. A current sensor 36 which is a digital output current sensor is powered by line 34 and includes a detector 38. The current sensor 36 in combination with load resistor 56, which is connected to the power and communication trainline 10, is used in an automatic train serialization scheme described in U.S. patent Ser. No. 08/584,402 filed Jan. 11, 1996. That application is incorporated by reference herein with respect to the details of the current sensor and automatic train serialization. Current sensor 36 using detector 38 senses the current in the trainline by monitoring the current in conductor 16 as shown in FIG. 3.

Each of the cars includes a storage device which stores identification data which includes at least the serial number, braking ratio, light weight, and gross rail weight of the car. Other parameters that can be stored and are car specific include car type (using, for example, AAR Section L classes), empty to fully loaded spring travel (to be used for load sensing), brake cylinder area, number of brake cylinders, lever ratio or efficiency, empty/load valve type (if present), overall car length (used to determine distance from locomotive to individual car in combination with serialization and train length) and brake system configurations. The storage device is permanently mounted to the car and need not be changed. If there is change in the information, preferably the storage device is programmable.

In a preferred embodiment, a storage device is a communication node 40 of the communication network. The subsidiary node includes a Neuron controller 42 having the car identification data therein and communicates with the car control device 30 by transceiver 44. A DC converter 46 provides power from line 34 to the Neuron 42 and the transceiver 44. The Neuron 42 also receives an output from the digital output current sensor 36 and stores the current information. The Neuron 42 may control an optoisolator DC converter 52 which receives its power from line 34, to the solid state relay 54 connected to the trainline 10. Activation of solid state relay 54 connects the load resistor 56 to the power line. This is used in the current sensing routine for the current sensor 36. The use of a parallel load resistor as part of current sensing and serialization is described in the previous invention, U.S. patent application Ser. No. 08/584, 402.

The operation of the system illustrated in FIG. 1 is as follows. When the train is being made, the car control device 30 on each car energizes their corresponding car I.D. Neuron 42 via power line 34 and transceiver 44. The car control device 30 then reads the information stored in the car I.D. Neuron 42 via transceiver 44 and transmits this information over the power and communication trainline 10 to a control in the locomotive. Once the information has been received by the car control device and transmitted to the locomotive, the car control device 30 turns the car I.D. Neuron 42 off. The car I.D. information could be used to determine the amount of brake cylinder pressure to be applied to that particular car or simply to display the information, such as type or serial number of the car, gross weight or any other specific information stored in the car I.D. Neuron 42. As previously described, a car control device 30 can also request that the car I.D. Neuron 42 measure the current in the trainline at that specific car, and transmit this information to the car control device 30. The car control device 30 then transmits the current value to the locomotive to be used in a serialization scheme which will provide the actual position of the car as well as the car I.D. information to the central controller.

Although the current sensor 36 and its related circuits 50–56 are advantageously used with the car identification storage subsidiary node 40, the subsidiary node 40 can be used without the current sensing capability or its use in the serialization scheme.

Figure 2:
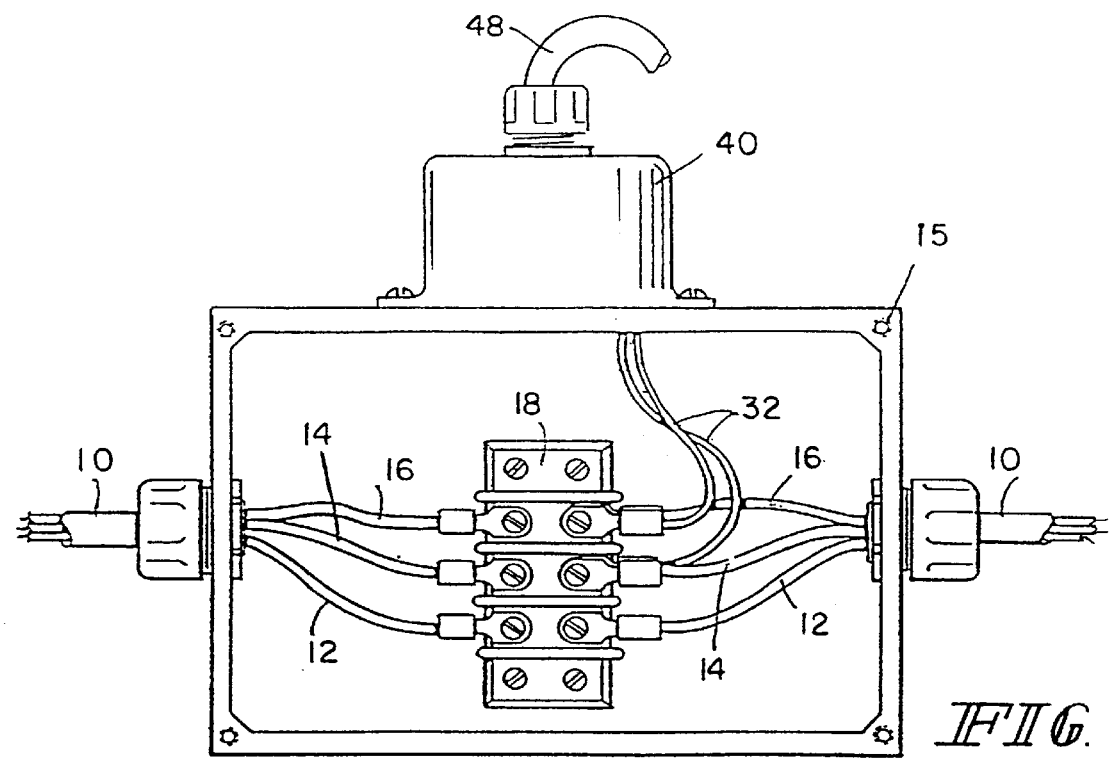
FIG. 2 is a side view of a junction box with its plate removed showing the attachment of a subsidiary communication node.

One location for the permanent connection of the storage device or the subsidiary node 40 is at a junction box 15 for a pair of train cables 10, as illustrated in FIG. 2. For sake of illustration, the train cable 10 includes three wires, 12, 14 and 16, interconnected at a terminal block 18. The car control device 30, not shown, is also connected to the terminal block 18 and the trainline 10 via lines 32. The subsidiary node 40 is connected by cable 48 to the car control device 30. Cable 48 includes all of the connections of the car control device 30 to the power and communication trainline 10 and the individual elements of the subsidiary node 40. The car control device 30 is generally located next to the device of which it is controlling, which preferably is an electro-pneumatic brake control valve. The incorporation of the current sensing mechanism at the junction box is illustrated in FIG. 3. One of the trainline wires 16 traverses an opening in the sensor head 38 of the current sensor 36 which is in the same housing with the subsidiary node 40. The current in line 16 is sensed and provided to the subnode Neuron 42.

Figure 4:
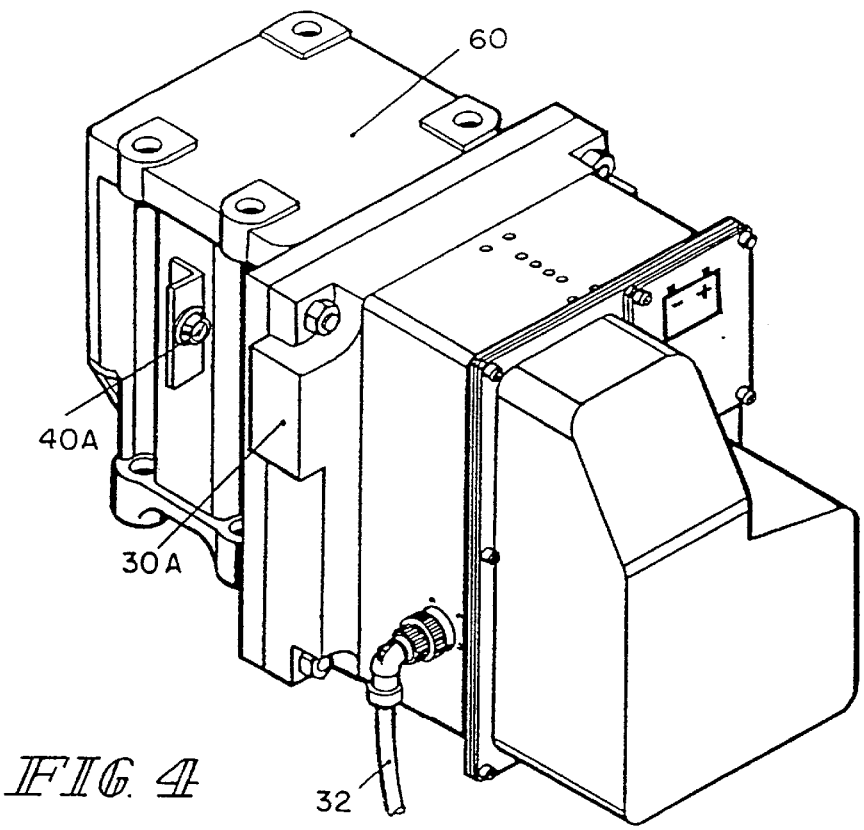
FIG. 4 is a perspective view of a pipe bracket with the storage device connected adjacent the local communication node.

An alternative location of the memory storage device is a pipe bracket which is permanently part of the car. The air brake system may be mounted and dismounted from the pipe bracket, but the pipe bracket remains on the car. FIG. 4 shows a pipe bracket 60 without the control valves or piping thereon, including the storage device 40A and the car control device 30A with its cable 32. While the storage device 40A is permanently mounted to the pipe bracket, the car control device 30A may be removably connected to the pipe bracket 60, directly, or may be part of the brake control valve which would be connected to the pipe bracket 60. The storage device 40A may be a passive transceiver, for example, a Motorola Indala System which includes a radio frequency passive transceiver, TAG, located on the pipe brackets 60. The storage device 40A is a small short range radio frequency transceiver with a unique number embedded in its chip.

When the car control device 30A is mounted to the pipe bracket 60 adjacent to the device 40A, the transceiver of 40A can communicate with a corresponding transceiver, reader, in car control device 30A. The storage device 40A receives power from the car control device 30 by using a miniscule part of the received energy and instantaneously transmits its unique stored data to the car control device 30A. The car control device 30A transmits this information to the locomotive controller where it can be used for determining the proper brake cylinder pressure to be applied for that particular car, or simply to display the information, such as the serial number and its location on the train.

Figure 5:
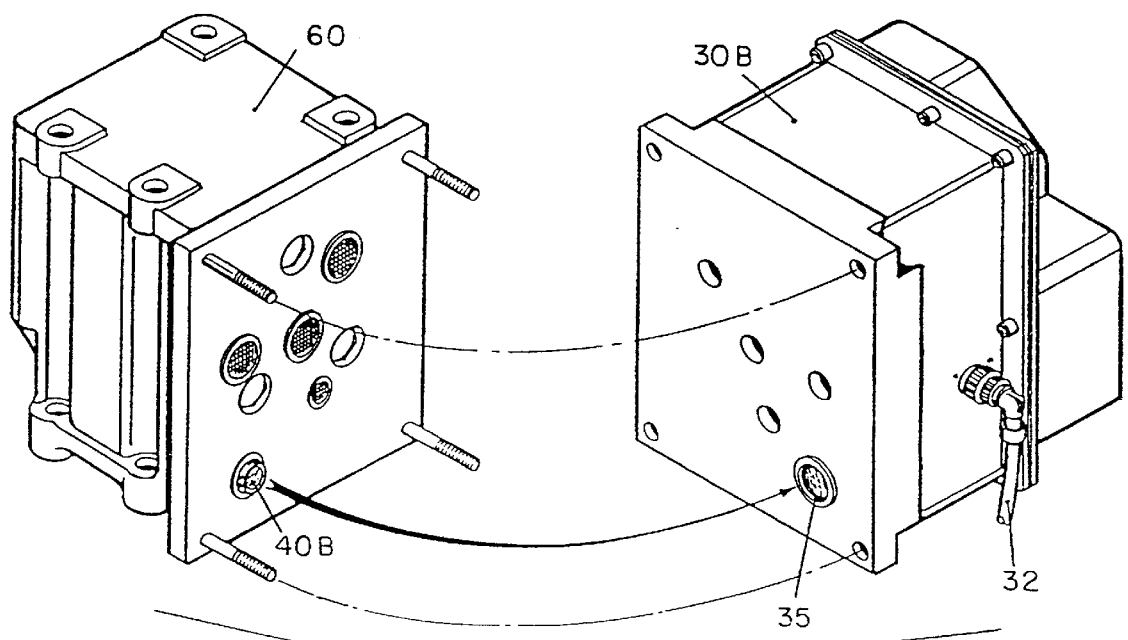
FIG. 5 is an exploded view of a pipe bracket with a storage device and a local communication node.

Another embodiment of the memory device 40 would be a memory device wherein the container of the memory includes external terminals. Such a device, as illustrated in FIG. 5 as 40B, received in a mating terminal recess 35 in the car control device 30B. The memory device 40B may be, for example, a Dallas Semiconductor Touch Memory or a Silicon Label in a stainless steel MicroCan, as means for storing the permanent car identification data. The single can memory device 40B is an EEPROM. Since the MicroCan serves both as a housing for the silicon chip and the electric contacts, the lid being the data and the rim being the ground, no wire or cable is required for the link between the car control device 30B and the memory device 40B.

The MicroCan 40B is permanently mounted on the pipe bracket 60 or any other permanent structure member of the car such that it makes physical contact with the cup shaped interface 35 located in the car control device 30B, when the car control device is mounted on the car. The cup shaped interface 35 under command from the Neuron chip in the car control device 30B provides the power to program or to read the EEPROM contained in the memory device 40B. As discussed previously, the car control device 40B then transmits the information to the locomotive controller.

While the storage device 40A of FIG. 4 and the storage device 40B of FIG. 5 have the advantage of not requiring any external wiring or cables, they are not easily combined with the current sensing circuit of FIG. 1. Additionally, the storage device 40A presently has limited memory and has to be factory programmed during manufacture. The storage device 40B is field programmable, however, it also has limited memory at the present time.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. In a train including at least one locomotive and a plurality of cars, each car being serially connected to an adjacent car and having a local communication node, and a controller in said locomotive in a network with said local communication nodes, each car including:

a storage device permanently mounted to said car and storing permanent identification data;

a reading device connected to the communication node of the car for reading said identification data stored in said storage device; and said local communication node communicating read identification data to said controller.

2. The train according to claim 1, wherein said storage device is a passive electronic device and said reading device sends a signal to said passive device to read said identification data.

3. The train according to claim 1, wherein said local communication node controls a pneumatic brake.

4. The train according to claim 1, wherein said reading device reads said identification data when activated.

5. The train according to claim 4, wherein said reading device is activated by said local communication node in response to a signal from said controller.

6. The train according to claim 1, wherein said storage device and said reading device are a subsidiary communication node controlled by said local communication node.

7. The train according to claim 6, wherein said local communication node is connected to an electric trainline at a junction box and said subsidiary communication node is mounted on said junction box.

8. The train according to claim 6, wherein said subsidiary node includes a current sensor to sense current in said trainline at said junction box.

9. The train according to claim 1, wherein said identification data includes at least one of serial number, braking ratio, light weight and gross rail weight.

10. The train according to claim 1, wherein said identification data includes at least one of serial number, braking ratio, light weight, gross rail weight, car type, empty to fully loaded spring travel, brake cylinder area, number of brake cylinders, lever ratio, empty/load valve type, overall car length and brake system configuration.

11. A method for automatically identifying a car in a train which includes at least one locomotive and a plurality of cars, each car being serially connected to an adjacent car and having a local communication node and a separate storage device storing identification data, and a controller in said locomotive in a network with said local communication nodes, the method including:

storing in said storage device permanent identification data which includes a serial number and at least one of braking ratio, light weight and gross rail weight;

reading identification data stored in said storage device; and communicating read identification data to said controller using said local communication node.

12. The method according to claim 11, wherein said storage device is part of a subsidiary communication node and said local communication node activates and deactivates said subsidiary communication node.

13. A method of equipping a car of a train for automatically identifying the car when the car is connected as part of a communications network with at least one locomotive and a plurality of cars, the method including:

permanently mounting a storage device storing permanent identification data on said car; and mounting a local communication node on said car and connecting it to said storage device and a trainline on said car.

14. The method according to claim 13, wherein said local communication node is mounted adjacent said storage device and is directly connected to said storage device.

15. The method according to claim 13, wherein said local communication node is mounted adjacent said storage device and is indirectly connected to said storage device by a wave transponder.

16. The method according to claim 13, wherein said local communication node is connected to said storage device by a cable.

17. The method according to claim 13, including storing in said storage device identification data which includes at least one of serial number, braking ratio, light weight and gross rail weight.

18. In a train including at least one locomotive and a plurality of cars, each car being serially connected to an adjacent car and having a local communication node, and a controller in said locomotive in a network with said local communication nodes, each car including:

a storage device permanently mounted to the car and storing permanent identification data which includes at least one of serial number, braking ratio, light weight, gross rail weight, car type, empty to fully loaded spring travel, brake cylinder area, number of brake cylinders, lever ratio, empty/load valve type, overall car length and brake system configuration; and said local communication node communicating stored identification data to said controller.

19. In a train including at least one locomotive and a plurality of cars, each car being serially connected to an adjacent car and having a local communication node, and a controller in said locomotive in a network with said local communication nodes, each car including:

a storage device mounted to the car and storing identification data which includes a permanent serial number and at least one of braking ratio, light weight, gross rail weight, car type, empty to fully loaded spring travel, brake cylinder area, number of brake cylinders, lever ratio, empty/load valve type, overall car length and brake system configuration; and said local communication node communicating stored identification data to said controller.

* * * * *